United States Patent Office 3,606,729
Patented Sept. 21, 1971

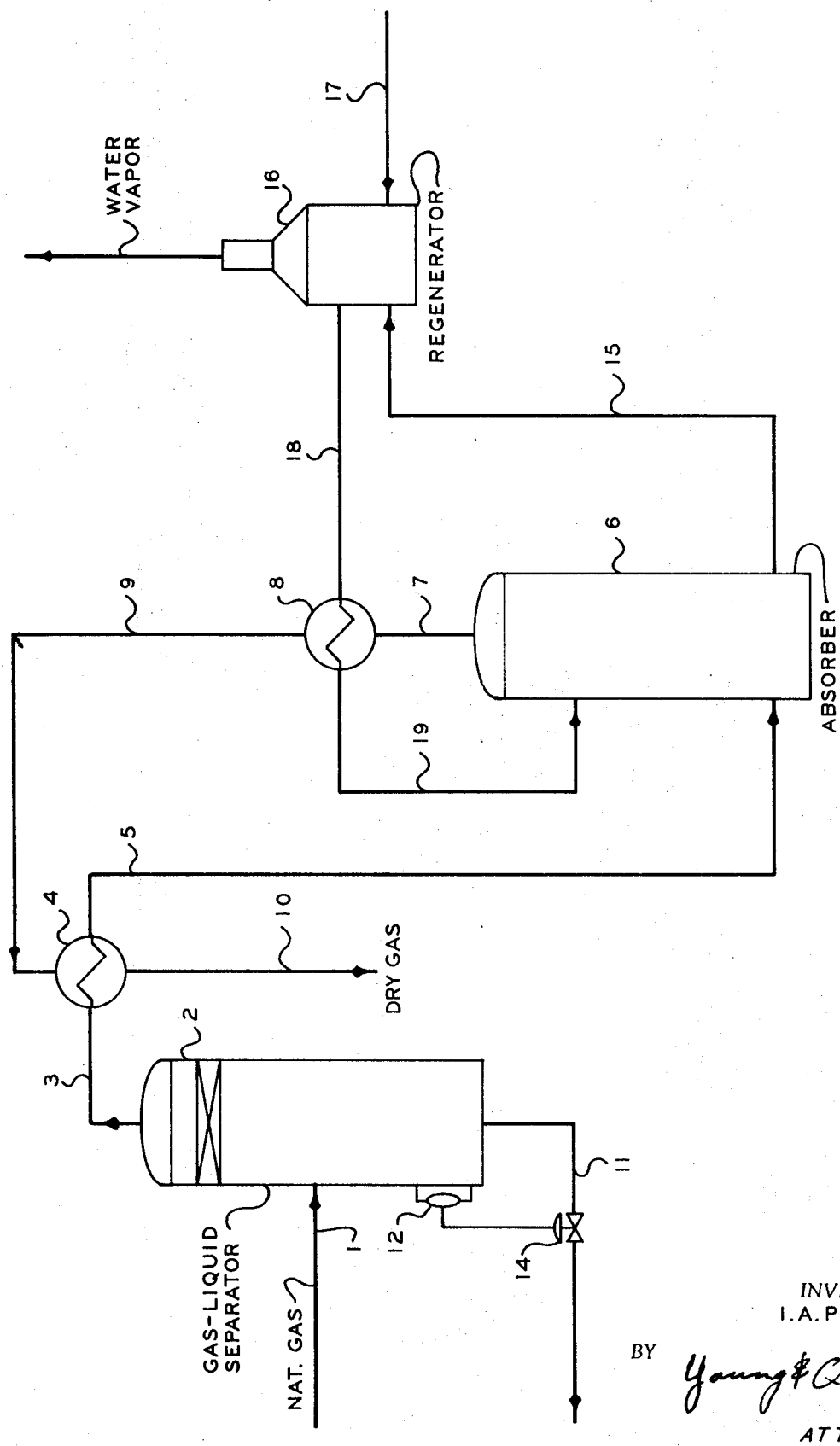

3,606,729
PREHEATING GAS FEED TO GLYCOL ABSORBER
Ivan A. Peterson, Bartlesville, Okla., assignor to
Phillips Petroleum Company
Filed Apr. 11, 1969, Ser. No. 815,347
Int. Cl. B01d 53/14
U.S. Cl. 55—32                                    6 Claims

ABSTRACT OF THE DISCLOSURE

A method of cooling a hot regenerated moisture absorbent and of preheating a feedstream gas containing moisture ahead of the dehydrator without the need for external cooling and heating sources. The method maintains the absorbent effectively free of foam causing condensable components carried by the feedstream gas.

---

My invention relates to a method of removing condensate and moisture from a gas stream. The invention further relates to a method of heating and cooling an absorbent and of heating and cooling the gas stream to and from a dehydrator. In another aspect my invention relates to improved methods of maintaining a moisture absorbent in a gas dehydrating operation substantially free of contaminants tending to induce foaming in the absorbent.

The discussion and disclosure of the invention which follows will be phrased substantially in terms of the treatment of natural gas. However, it should be understood that the process of this invention is applicable to many processes where a gas stream is to be dried with an absorbent material and wherein the absorbent material is regenerated by heating and then recycled to the drying step.

Field gas, i.e., natural gas from the producing wells, is collected, compressed, put through a gas-liquid separator to remove condensate, i.e., higher molecular weight hydrocarbons, dried in a contacting dehydrator with an absorbent, and then passed into a pipeline for distribution. The drying step not only extracts moisture from the gas, but also tends to extract remaining condensate from the gas. The absorbent is conventionally regenerated by heating to a temperature well above the boiling point of the absorbed water but below the boiling point of the absorbent.

However, when the absorbent additionally contains condensate, grave difficulties are encountered because the absorbent tends to foam severely in the regenerator or reconcentrator, making it difficult or impossible to maintain a proper fluid level, interfering greatly in controlling flow of rich (i.e., moisture-containing) absorbent to the reconcentrator and lean absorbent from the reconcentrator. Further difficulty arises in controlling the temperature and degree of moisture removal, requiring additional heat in order to boil off the condensate, and the boiled off, vaporized condensate may create additional fire hazards in the plant operation.

Of course, the absorbent, after being reconcentrated by heating, is at a fairly high temperature and must be cooled substantially in order to regain the ability to absorb further amounts of moisture. The cooling step heretofore has been accomplished by external refrigeration, expensive air cooled heat exchangers, and the like.

I have found to be highly effective in gas treating processes the preheating of the gas after the separator, thus raising the gas temperature above the condensing point of the condensate, but not sufficiently high as to interfere in the ability of the absorbent to remove moisture. The preheating step can be accomplished by use of external heat sources such as gas combustion, steam heating, steam tracing, and the like, or most effectively and simply by heat exchange within the system.

One approach is to accept the pickup of condensate by the absorbent as a fact of the operation and to secondarily treat the absorbent by addition of chemical defoamers. And, in the reconcentrator, the valuable condensate (gasoline) driven off or boiled out of the absorbent is recovered in a separate reabsorber.

The use of refrigeration effects, external heat sources, use of antifoam products, installation of reabsorbers, all represent expensive and expensive to operate equipment. Simplification of the entire system, improvement in overall results in operation, economies in overall operation, without the need for heat sources, refrigeration effects, chemical additives to the absorbent, and the like, are worthwhile accomplishments.

I have further discovered and developed a unique and greatly simplified process for stripping of moisture and condensate from a stream of gas. The central features of my invention involve the method of cooling of the absorbent after regenerating, and the heating and cooling of the gas stream before and after the drying step.

By the method of my invention, the hot regenerated absorbent is cooled by indirect heat exchange with the dried gas stream from the dehydrator. The dried gas stream is thus heated and, in turn, is used to preheat the gas stream from the separator ahead of the dehydrator. The dried gas stream by this latter heat exchange step is cooled sufficiently for delivery to the product pipeline.

Thus, by the process of my invention, the gas is preheated after the separator, and preheating of the gas stream before the dehydrator is accomplished without the need for externally derived heat sources. The cooling of the hot regenerated absorbent is accomplished without the need for externally derived cooling. At the same time, by my invention, the absorbent does its job of drying without picking up any condensate which otherwise would tend to cause severe foaming and difficulties in operation of the reconcentrator.

Therefore, it is an object of my invention to provide as gas drying process whereby a gas can be treated with an absorbent with reduced requirements for external sources of heating and cooling.

It is an additional object of my invention to simplify a gas treating operation so that dehydration with an absorbent can be carried out without the need for an external source of heat for the gas stream to the dehydrator and further without an external source of cooling for cooling hot regenerated absorbent for recycle.

It is a further object to provide an improved method for maintaining a moisture absorbent in a gas dehydrating operation substantially free of contaminants tending to induce foaming in the absorbent.

Another object is to provide an improved method for the removal of condensate and moisture from a high pressure gas stream.

It is another object of this invention to provide a new process of cooling a moisture absorbent after reconcentration by heat exchange with another stream within the overall process, and of heating a gas stream prior to dehydration by contact with another stream within the overall process, thus operating without external cooling sources or heating sources.

It is an additional object of this invention to provide a simplified process of treating a field gas stream prior to transfer to a high pressure transmission pipeline.

Other aspects, objects, and the several advantages of this ivnention will become apparent to one skilled in the art from the following description and the claims appended hereto.

Natural gas collected from producing fields is known as "field gas." The field gas is a variable mixture, primarily of the low molecular weight paraffin hydrocarbons such as methane, ethane, propane, and butane. Field gas may also contain lesser proportions of nitrogen, carbon dioxide, hydrogen sulfide, and, occasionally, small proportions of helium. Methane is almost always the major constituent. Field gas frequently contains some hydrocarbons such as pentane and hexane, and sometimes even higher hydrocarbons.

The higher hydrocarbons are of the gasoline class and may be of straight or branched chain, to a lesser extent including naphthenes, aromatics, and the like. These components, frequently called "condensables" or "condensate," making up this gasoline refraction normally are removed before the gas is supplied to a high pressure transmission line.

The condensate is a valuable material in its own right for recovery and sale as gasoline or as components of gasoline mixtures for automobiles and the like. Further, the condensate, if left in the natural gas, is hazardous. The condensate tends to condense out of the natural gas at lower temperatures, and may present fire and explosion hazards.

The condensed gasoline components or condensate, entrained in the gas, is removed from the field gas by treatment in a gas-liquid separator. In the separator, the field gas is passed upwards through a chamber, commonly called a scrubber. The condensed liquids, which may include some moisture as well as condensate, settle to the bottom of the separator and are drained. The gas leaving the separator is saturated with both condensate and moisture, both in the gaseous phase, according to the gas temperature. If the gas is cooled before it passes up through the dehydrator, some of the remaining hydrocarbons will condense out in the dehydrator and become mixed with the absorbent.

The moisture in the field gas is objectionable. At relatively low ambient and gas temperature, the moisture tends to condense out as liquid water or even as ice, causing corrosion, and also other difficulties in transmission and distribution of the gas, such as icing of controls, valves, and the like.

The moisture is removed most conveniently by direct contact with an absorbent material such as one of the glycols. The commonly used absorbents not only effectively remove the moisture from the gas stream, but also tend to become contaminated with some of the remaining amounts of condensate not previously removed by the separator, as described hereinbefore.

The absorbent is regenerated by heating in a regenerator or a reconcentrator where the rich absorbent containing the moistue (and condensate where such also have been picked up) is heated to a temperature well above the boiling point of water and yet below the boiling point of the absorbent. The water thus is boiled out. However, when the rich absorbent contains a burden of entrained condensate (higher hydrocarbons) in addition to the absorbed moisture, the operation of the reconcentrator becomes extremely erratic. Severe foaming of the absorbent as has been described hereinbefore.

The contamination of the absorbent by the condensate is effectively prevented by preheating the scrubbed gas to a temperature above the condensation temperature of the higher boiling hydrocarbons still present in the gas from the gas-liquid separator such that the scrubbed gas will retain the remaining condensate, yet still allow the lean absorbent to extract or absorb the moisture.

My invention cools the hot reconcentrated absorbent from the reconcentrator without need for expensive cooling methods by indirect heat exchange with the dried gas stream from the dehydrator. My invention further uses the thus heated dried gas stream by subsequent indirect heat exchange to preheat the gas from the separator ahead of the dehydrator. This achieves the desirable and effective preheating without the use of external heat sources, and, at the same time, accomplishes effectively the cooling of the dried stream to a point where it is suitable for final transfer to the distribution pipeline.

When the ambient temperatures are high or moderate, so that heat is picked up by, instead of lost from, the stream of gas flowing from the separator to the dryer, condensation of hydrocarbons will not occur. However, when ambient temperatures are low, the gas stream tends to cool, and further the higher hydrocarbons in the gas will condense in the dehydrator and contaminate the absorbent with consequences as hereinbefore discussed. With natural gas, the heating of the gas after it passes out of the separator may only be required when ambient temperatures are relatively low.

My invention may be understood by referring to the figure which shows a natural gas treatment process. Briefly, field gas is collected, compressed, passed through a gas-liquid separator for removal of entrained liquids, then is heated before an absorber or dehydrator. The gas, dried after passing through the absorber, goes through a heat exchanger to cool the reconcentrated absorbent through a heat exchanger to heat the gas from the separator before the absorber. In turn, this cools the dried gas, which is desirable, before it enters the pipeline.

Referring now to the figure in more detail, field gas is collected, brought to a compressor (not shown) which produces a compressed gas at a pressure of about 1010 p.s.i.g. and at a temperature of about 130° F. This compressed gas then passes through line 1 to the gas-liquid separator 2. Condensate in the compressed gas is substantially removed in the separator 2 along with any moisture in liquid droplet form and removed to recovery via line 11. The level of liquid in separator 2 is prevented from rising above a predetermined level by the use of liquid level control 12 which actuates valve 14. The gas from separator 2 is at a maximum of about 130° F. and a minimum of about 60° F. and goes through line 3 to the indirect heat exchanger 4. Here the gas is tempered to a temperature of 75° F. minimum by indirect heat exchange with hot dried gas from line 9. By this indirect heat exchange, the dried gas, passing through line 9, thus is cooled sufficiently from about 87° F. down to about 72° F. so as to enter the gas distribution line 10.

The gas adjusted to a minimum temperature of about 75° F. by indirect heat exchange in heat exchanger 4, then is taken by line 5 to the absorber or dehydrator 6. In the dehydrator 6 the gas is dried by direct contact with reconcentrated absorbent which has been brought to the absorber 6 by line 19. Since the gas from the separator 2 has been temperature tempered in heat exchanger 4, it is at a temperature whereby it will retain in gas phase any remaining condensate, yet readily give up its moisture to the absorbent in the absorber 6.

The dried gas from absorber 6, still at a temperature of about 75° F., is brought by line 7 to the indirect heat exchanger 8. Here the hot regenerated absorbent is cooled from about 300° F. down to about 90° F. prior to being conducted by line 19 to the absorber 6 to remove moisture from additional gas brought to the absorber by line 5.

The dried gas, heated now to about 87° F. by the indirect heat exchange in heat exchanger 8, then is conducted by line 9 to indirect heat exchanger 4 where it is cooled to about 72° F. for further use or for pipeline distribution as I have already described.

The reconcentrated absorbent contacts the gas in absorber 6. The absorbent removes moisture from the gas and becomes rich (i.e., moisture-containing) absorbent. The rich absorbent is taken by line 18 to the reconcentrator or regenerator 16 where the temperature is raised to about 300° F. by heat supplied by gas combustion and the like, and the moisture is stripped as water vapor and removed by the stack, leaving the hot reconcentrated (also known as regenerated or lean) absorbent. The regenerated absorbent is too hot at about 300° F. for reuse and so is taken by line 18 to the indirect heat exchanger 8 to be cooled to about 90° F. Here, the cooling is obtained by indirect heat exchange with dried gas as I have discussed before. The cooled regenerated absorbent at about 90° F. then is recycled by line 19 to the absorber 6.

From the description and example, it will be seen that I have provided an effective process and method for avoiding pickup of condensate by the absorbent, of cooling the hot regenerated absorbent, of preheating a gas ahead of a dehydrator, and of cooling the dried gas, all with effective use of other streams in the process.

Reasonable variations and modifications are possible within the scope of the disclosure without departing from the scope and spirit thereof.

I claim:

1. A process of cooling a hot regenerated absorbent in a gas drying operation which comprises:
  (a) heating a moisture-containing absorbent so as to expel the moisture and leave a hot regenerated absorbent,
  (b) contacting the said hot regenerated absorbent by indirect heat exchange with a stream of dried gas and thereby cooling the regenerated absorbent and heating the said dried gas,
  (c) contacting the heated dried gas stream by indirect heat exchange with a moisture-containing gas stream thereby cooling the said dried gas and warming the moisture-containing gas stream, and
  (d) contacting the warmed moisture-containing gas stream by direct contact with the cooled regenerated absorbent from step (b) and thereby producing a dried gas stream.

2. A process to maintain a glycol absorbent essentially free of foam-causing condensables in a gas treating operation which comprises:
  (a) heating gas containing moisture and condensate by indirect heat exchange sufficiently to permit a contacting step with said glycol absorbent to remove said moisture without removing said condensate, and
  (b) contacting the said heated gas with said glycol absorbent, thereby removing said moisture without removing said condensate and thereby producing a dried gas.

3. The process of claim 2 wherein step (b) is preceded by a gas-liquid separating step to thereby remove substantially the condensate contained in the said natural gas.

4. The process of claim 2 wherein step (b) is succeeded by:
  (c) heating the glycol absorbent containing moisture and thereby expelling the moisture to waste.
  (d) cooling the regenerated glycol absorbent by indirect heat exchange with dried gas from step (b),
  (e) cycling the heated dried gas from step (d) to the indirect heat exchange step (a) and thereby cooling the said dried gas, and
  (f) recovering the cooled dried gas as a product.

5. A process for stripping moisture from a gas stream which comprises:
  (a) heating the gas stream containing moisture by indirect heat exchange with the dried stream from step (f) hereinafter recited,
  (b) contacting the said stream with an absorbent and thereby removing moisture contained in said stream,
  (c) heating the absorbent containing moisture whereby moisture is expelled as waste and the absorbent is regenerated,
  (d) cooling the hot regenerated absorbent by indirect heat exchange with the dried stream from step (b) which said dried stream is thereby heated,
  (e) recycling the cooled regenerated absorbent to the drying step (b),
  (f) cooling the heated dried stream from step (d) by recycle to the heat exchange step (a) whereby the said dried stream is cooled, and
  (g) recovering the cooled dried stream from step (f) as a product substantially stripped of moisture.

6. The process of claim 5 wherein the said stream is compressed field gas, the said absorbent is a glycol, wherein in the heating step (a) the temperature of the said separated stream is adjusted to about 70° to about 140° F., and wherein the cooling step (e) the lean glycol is cooled to about 80° to about 120° F.

References Cited

UNITED STATES PATENTS

| | | | |
|---|---|---|---|
| 3,182,434 | 5/1965 | Fryer | 55—32 |
| 3,288,448 | 11/1966 | Patterson et al. | 55—32 |
| 3,331,188 | 7/1967 | Sinex | 53—31 |

REUBEN FRIEDMAN, Primary Examiner

C. N. HART, Assistant Examiner

U.S. Cl. X.R.

55—208